(12) United States Patent
Feeser

(10) Patent No.: US 11,194,567 B1
(45) Date of Patent: *Dec. 7, 2021

(54) SECURITY PATCH UPDATE PROCESSOR

(71) Applicant: OPEN INVENTION NETWORK LLC, Durham, NC (US)

(72) Inventor: Colin Lee Feeser, Atlanta, GA (US)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/848,677

(22) Filed: Apr. 14, 2020

Related U.S. Application Data

(63) Continuation of application No. 16/438,214, filed on Jun. 11, 2019, now Pat. No. 10,620,939, which is a continuation of application No. 15/590,447, filed on May 9, 2017, now Pat. No. 10,318,274, which is a continuation of application No. 14/680,708, filed on Apr. 7, 2015, now Pat. No. 9,645,846, which is a continuation of application No. 14/258,211, filed on Apr. 22, 2014, now Pat. No. 9,032,382, which is a
(Continued)

(51) Int. Cl.
| | |
|---|---|
| G06F 9/44 | (2018.01) |
| G06F 8/65 | (2018.01) |
| H04L 12/24 | (2006.01) |
| G06F 8/658 | (2018.01) |
| G06F 9/48 | (2006.01) |

(52) U.S. Cl.
CPC .............. *G06F 8/65* (2013.01); *G06F 8/658* (2018.02); *G06F 9/4843* (2013.01); *H04L 41/08* (2013.01); *H04L 41/082* (2013.01); *H04L 41/28* (2013.01)

(58) Field of Classification Search
None
See application file for complete search history.

(56) References Cited

U.S. PATENT DOCUMENTS

| | | |
|---|---|---|
| 6,009,274 A | 12/1999 | Fletcher et al. |
| 6,327,617 B1 | 12/2001 | Fawcett |
| (Continued) | | |

OTHER PUBLICATIONS

Barber et al., "Create an Enterprise Patch Management Infastructure with WSUS", Dec. 2, 2005, Syngress.
(Continued)

*Primary Examiner* — Qamrun Nahar

(57) ABSTRACT

A method, system, and program product are provided for updating software deployed on computers in an enterprise computer network wherein each computer has a software update agent installed to enable the computer to receive software patch updates. The method includes determining a required software component and updates; determining a version of the agent and updating the agent if required; selecting a server from which required updates are to be downloaded; scanning a plurality of software components on a selected computer and comparing the components with updates available on the server to determine required updates; downloading the required patches from the server; and installing the patches on the selected computer. The system includes components that perform the method steps when operated on a computer in the network. A computer readable medium implements the method for updating software deployed on computers in a network.

16 Claims, 3 Drawing Sheets

Related U.S. Application Data continuation of application No. 13/902,926, filed on May 27, 2013, now Pat. No. 8,713,555, which is a continuation of application No. 11/766,503, filed on Jun. 21, 2007, now Pat. No. 8,473,938.

(56) References Cited

U.S. PATENT DOCUMENTS

| | | | |
|---|---|---|---|
| 6,466,328 B1* | 10/2002 | Bradley | G06F 3/1211 358/1.15 |
| 6,751,794 B1 | 6/2004 | McCaleb et al. | |
| 6,766,373 B1 | 7/2004 | Beadle et al. | |
| 6,986,133 B2 | 1/2006 | O'Brien et al. | |
| 6,990,660 B2 | 1/2006 | Moshir et al. | |
| 7,003,767 B2 | 2/2006 | Larkin | |
| 7,093,246 B2 | 8/2006 | Brown et al. | |
| 7,096,464 B1 | 8/2006 | Weinmann | |
| 7,111,204 B1 | 9/2006 | Couturier et al. | |
| 7,930,397 B2 | 4/2011 | Midgley | |
| 2002/0100036 A1 | 7/2002 | Moshir et al. | |
| 2003/0233483 A1* | 12/2003 | Melchione | G06F 8/61 719/310 |
| 2004/0015938 A1 | 1/2004 | Taylor | |
| 2004/0181790 A1 | 9/2004 | Herrick | |
| 2005/0097543 A1 | 5/2005 | Hirayama | |
| 2005/0144616 A1 | 6/2005 | Hammond et al. | |
| 2005/0210459 A1 | 9/2005 | Henderson et al. | |
| 2006/0010435 A1 | 1/2006 | Jhanwar et al. | |
| 2006/0075001 A1 | 4/2006 | Canning et al. | |
| 2006/0080656 A1 | 4/2006 | Cain et al. | |
| 2006/0130037 A1 | 6/2006 | Mackay | |
| 2006/0136892 A1 | 6/2006 | Branch et al. | |
| 2006/0218548 A1 | 9/2006 | Mason et al. | |
| 2006/0248522 A1 | 11/2006 | Lakshminarayanan et al. | |
| 2006/0265630 A1 | 11/2006 | Alberti et al. | |
| 2008/0072233 A1* | 3/2008 | Steux | G06F 3/1212 718/106 |
| 2008/0086734 A1* | 4/2008 | Jensen | G06F 9/4881 718/104 |
| 2008/0163219 A1* | 7/2008 | Marwinski | G06F 9/4881 718/101 |
| 2008/0244584 A1* | 10/2008 | Smith | G06F 9/4881 718/102 |

OTHER PUBLICATIONS

Bradley, "WSUS vs. Commercial Software: Which is Better Choice?", Search WinComputing.com, Oct. 4, 2005.

Edwards, "Patch Management and WSUS", Jun. 8, 2005, Windows IT Pro.

Leznek, "Next-Generation Patch Management: Introducing Windows Server Update Services", Nov./Dec. 2005.

Tiow et al., "Distributed Web Caching with Incremental Update", 2002, IEEE, pp. 1147-1151.

* cited by examiner

SECURITY PATCH UPDATE PROCESSOR

BACKGROUND OF THE INVENTION

The present invention relates generally to maintaining computer software deployed in a corporate enterprise's information processing systems and, more particularly, to methods and systems for managing security patch updates to the software installed on the servers and workstations of a corporate enterprise.

Most security incidents with computers today are caused by flaws in software referred to as vulnerabilities. The ultimate solution to software vulnerabilities is application of patches. Software vendors generally release patches to fix vulnerabilities in their software products. If applied correctly, patches remove vulnerabilities from computer systems.

An important problem is to determine how often to update the computer systems in the corporate enterprise with the necessary patches. There are many factors that go into determining when patches should be applied. One factor is the number of vulnerabilities to patch. Sorting through all the vulnerabilities to find the relevant vulnerabilities to patch can be tedious and labor-intensive. Before being applied in a production environment, each patch must be tested to ensure that it works properly and does not interfere with existing applications installed on a computer system. In addition, every patch requires installation after testing. If a patch is applied to a critical system, downtime can be very costly.

Although it used to be a common practice among software vendors to release patches as soon as they were available, the common practice today is to release patches on a monthly basis. For example, Microsoft Corporation switched to a monthly patch release cycle in October 2003. "Patch Tuesday" is the second Tuesday of each month and is the day on which Microsoft releases security patches.

In large corporations, keeping thousands of computers up-to-date with security patches requires a great deal of Information Technology (IT) department manpower every month to update the servers and workstations with the latest released patches. This results in numerous people writing different scripts customized to each set of patches. The login script then checks every workstation and applies the patches. Other scripts are used to manually update servers either because they are missed by Microsoft's Systems Management Software or for new server builds, and are applied to machines that access the corporation's network from an Internet Remote Access Service (IRAS). More scripts are written to apply to new workstations that are being built.

There is a need in the art for improved techniques for managing security patch updates to software installed on the servers and workstations of a large enterprise to significantly reduce the amount of monthly work required to maintain backup process scripts. There is a further need for a method that enables the timing of the download and installation of security patch updates, and computer reboot, if necessary, to be under direct control of a system administrator.

SUMMARY OF THE INVENTION

Embodiments of the invention are directed to methods and systems for managing security patch updates to software installed on the servers and workstations of a large enterprise. In one embodiment, the security patch update processor is a tool for inspecting personal computers and servers running Microsoft Windows® operating system software for required security patches and patching the software if required. It has been designed to be secure, adaptable and modular, making it easy to update and modify. The security patch update processor of the present invention is completely configurable using command line switches and/or a configuration file.

In one aspect of the invention, a method, system, and program product are provided for updating software deployed on a plurality of computers in an enterprise computer network wherein each computer has a software update agent installed to enable the computer to receive software patch updates. The method includes determining a required software component and software patch updates; determining a version of the software update agent and updating the software update agent if required; selecting a server from which required software patch updates are to be downloaded; scanning a plurality of software components on a selected computer and comparing the software components with software patch updates available on the selected server to determine required software patch updates; downloading the required software patches from the selected server; and installing the required software patches on the selected computer. The system includes a plurality of components that perform the steps of the method when operated on a computer in the network. The computer readable medium implements the method for updating software deployed on a plurality of computers in an enterprise network.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Embodiments of the invention significantly reduce the amount of monthly work required to maintain backup process scripts. The invention will be described herein in the context of a corporate enterprise environment in which Microsoft server and client products are installed on the host computer systems, servers, workstations, and laptops of the corporate enterprise. However, the inventive concepts described herein are applicable to other operating system environments including Linux, and other application software products that regularly issue security patches over the Internet. For an installed base of Microsoft software products, the invention makes use of the Microsoft Windows Server Update Services (WSUS) server. An enterprise can allow the WSUS server to maintain communication with Microsoft, which automatically downloads all released patches to the WSUS server. Each month, an enterprise representative (e.g., system administrator) approves patches that have been determined as acceptable by the enterprise and that should be installed on its machines.

The security patch update processor removes the need to have individual custom scripts created every month to handle the different security updates. Furthermore, the security patch update processor makes use of the internal Windows update service to allow each machine to perform a self-evaluation in conjunction with settings on the centralized WSUS server. The security patch update processor allows an enterprise to more closely manage when the Windows update process takes place using scripts. The security patch update processor is designed to be configurable and flexible to apply to different environments and needs. The Windows Server Update Services software is downloaded and installed on an enterprise server. Windows Server Update Services software maintains itself by automatically downloading all released software updates.

Figure 1:
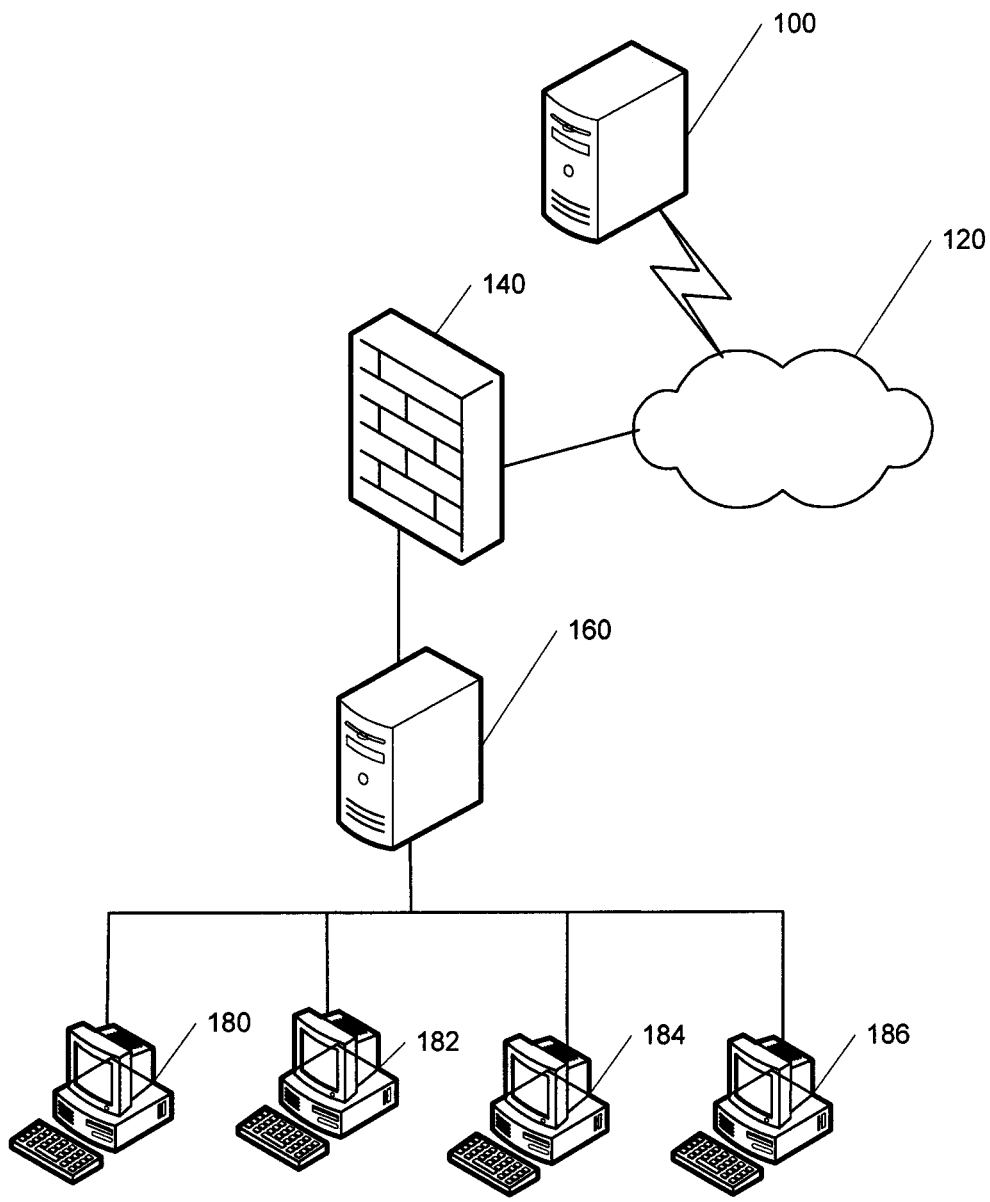
FIG. 1 illustrates a prior art single server scenario for distributing updates to client computers in a simple computer network using a Microsoft Windows Server Update Services (WSUS) server. This is the server component that is installed on a computer running a Windows Server 2003 operating system inside the corporate enterprise firewall.

FIG. 1 illustrates a prior art single server scenario for distributing updates from server 100 via the Internet 120 to client computers 180, 182, 184, 186 in a simple computer network using a Microsoft Windows Server Update Services (WSUS) server 160 behind corporate firewall 140. System administrators can configure how client computers 180, 182, 184, 186 communicate with WSUS server 160 by using group policy or by scripting with the WSUS API.

The enterprise system administrator selects and approves the security updates to install on its machines. The security patch update processor sets the machines it runs on to get updates from the WSUS, then scans the machine for its requirements using the Windows Server Update Service, and optionally downloads and installs the required updates from the WSUS. The security patch update processor enables immediate updates to the machine it runs on providing an advantage over prior art processes for installing patches. This is especially important when enterprise policy requires that all affected machines be patched with updates within a set period of time. The security patch update processor also can be configured to automatically reboot, prompt for reboot or suppress reboot according to the needs of the machine type. The security patch update processor can take a large number of command-line settings, or can optionally use a configuration file to pass command-line arguments. In summary, the security patch update processor provides the ability to scan, download, and install patches which are enterprise-managed on a WSUS.

In an exemplary embodiment of the present invention, the security patch update processor performs the following process steps:

1. Checks for required components and updates for these components based upon the location set in the configuration file.
2. Checks the version of Microsoft Windows Update Agent® (WUA) and updates according to minimum version, update location and command-line set in the configuration file.
3. Sets or removes Windows Server Update Service® (WSUS) settings according to command-line switches or configuration file.
4. Scans computer for required security patches. If WSUS settings are set, this scan takes place against the managed WSUS server. Otherwise the scan takes place against the Microsoft Windows Update site.
5. Downloads patches determined to be required for the specific machine by the scan. If WSUS settings are set, this download comes from the managed WSUS server. Otherwise the download comes from the Microsoft Windows Update site.
6. Installs patches previously downloaded as a result of the scan.
7. Allows for versioning of the patching process by using the configuration file.
8. All process steps are prompted by default, although command-line switches can set prompting to "silent," "suppress reboots" or "prompt for reboots only." These settings can also be applied via the configuration file.
9. The configuration file, named pup.cfg, can be located in the same folder as the patch update processor executable file, pup.exe (default setting), in which case command-line switches override settings in the configuration file. The location of the configuration file can be passed via the command-line switch. In this case, it is the only command-line switch that is recognized. All other settings will come from the configuration file.
10. Using the configuration file registry, settings can be added or removed.
11. All operations performed by the security patch update processor are logged by default to a log file located in the same folder location as pup.exe, named pup.log. The log file location and name can be changed to any other location using either the command-line switches or in the configuration file. If the configuration file is used, the name of the file can be represented by the name of the machine creating the file.

Figure 2:
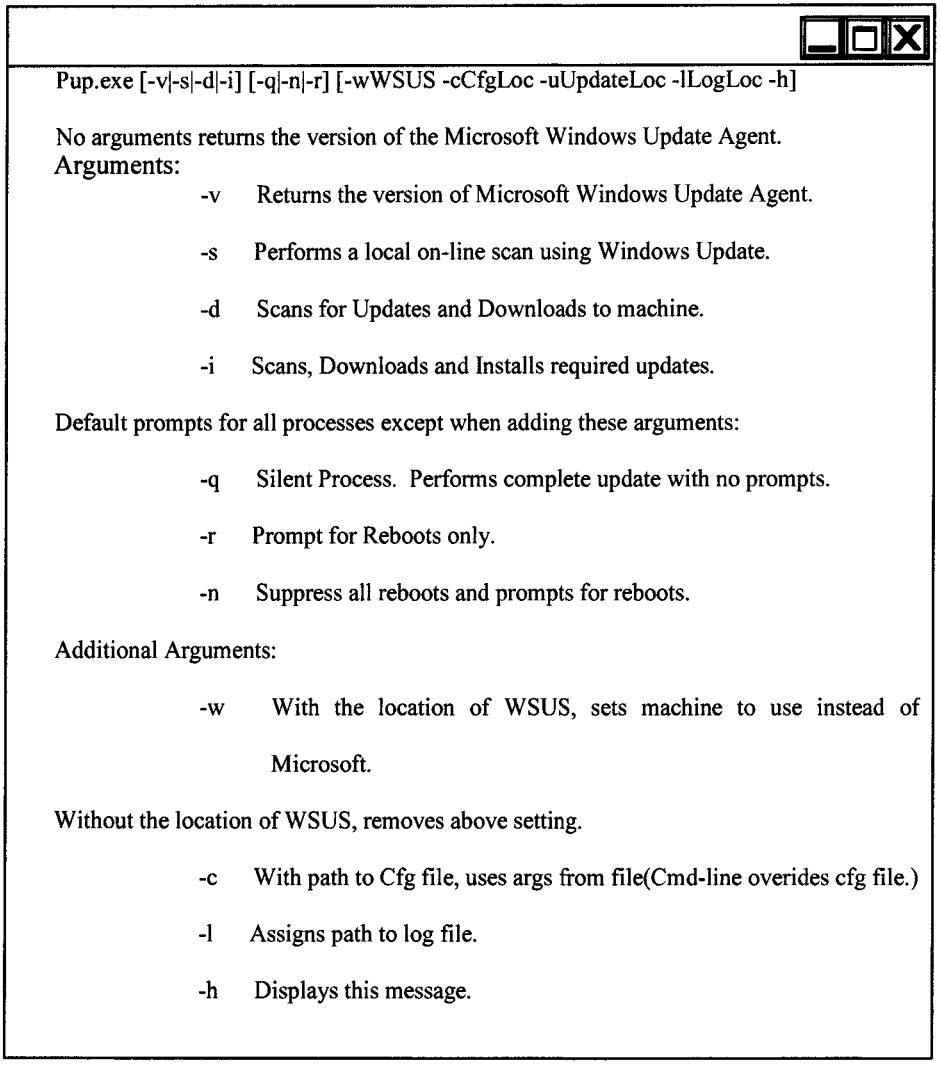
FIG. 2 illustrates an exemplary help screen for the security patch update processor that is accessible to the enterprise system administrator.

The security patch update processor can be configured in two different ways. Settings can be passed either using the command-line or a configuration file. While most settings can be set on the command-line, there are more settings available using the configuration file. The administrator screen illustrated in FIG. 2 can be displayed using the -h switch. If the -h switch is used, all other switches are ignored.

Even though the administrator screen indicates that not passing arguments will perform the same way as a -v switch (i.e., returns the version of WUA), this behavior is modified when a configuration file (pup.cfg) is present in the same folder location of the executable file (pup.exe). In this scenario, passing no arguments will cause execution to use the settings in the configuration file.

Security Patch Update Processor Command-Line Switches

The command-line switches come in three different sets. The first set, or process set, determines which process execution will follow. The -v switch will simply show the version of the Windows Update Agent which will also be shown during all other processes. The main processes, however, scan, download, and install build upon each other.

So, only one process switch is needed at a time. The second set of switches amends how the process switch is run in regard to prompting. Only one of these switches is used at a time. In the absence of a prompting, switch execution will prompt at every step during the selected process (when not overridden by the configuration file). The third set of switches can all be used at the same time, with the exception of the -h switch (help screen).

The following scenarios show how the different switches can be used. In these examples, the assumption is that there is not a configuration file unless specified on the command-line.

Pup -s

This example is the most basic command and will cause the machine to simply scan and report which patches are needed. If the WSUS settings are not set, then it will use the Microsoft Update Internet site, otherwise it will use WSUS.

Pup -d

This is another example of the most basic command and will cause the machine to simply scan, report which patches are needed and download those patches to the machine in preparation of install. If the WSUS settings are not set, then it will use the Microsoft Update Internet site, otherwise it will use WSUS. There will be no prompting for a simple scan.

Pup -i

This is another example of the most basic command and will cause the machine to scan, report which patches are needed, download those patches to the machine in preparation of install, and install them. If the WSUS settings are not set, then it will use the Microsoft Update Internet site, otherwise it will use WSUS. Since there is not a prompting switch, there will be a prompt to allow downloading to continue.

Pup -whttp://wsus.enterprise.com -i

This example shows how to set the WSUS. Note that the WSUS will only be set the first time. The -w switch will be ignored after that unless the setting changes. Since there is not a prompting switch, every step will be prompted except for the scan. Prompts will precede the download and install steps, and if a reboot is required a message box will appear giving the option to reboot or not.

Pup -w -i

This example shows how to remove the WSUS setting. Note that the WSUS removal will only be set the first time. The -w switch will be ignored after that unless the setting changes.

Pup -whttp://wsus.enterprise.com -ld:\logs\pup.log -i -r

This example uses the WSUS setting for the install, redirects the log file, instructs execution to scan, download and install the patches, and then prompts if a reboot is required. Otherwise there will be no other prompting.

Pup -whttp://wsus.enterprise.com -ld:\logs\pup.log -i -q

This is the exact same configuration as in the preceding example, except with a -q switch that suppresses all prompts, including the reboot prompt. With this setting, if a reboot is required, the machine will reboot automatically as soon as all of the installs are complete. If a reboot is not required, the process will complete and simply come to an end.

Pup -whttp://wsus.enterprise.com -ld:\logs\pup.log -i -n

This is the exact same configuration as in the two preceding examples, except with a -n switch that suppresses all prompts and all reboots as well. With this setting, if a reboot is required, the machine will not reboot. The process will complete and simply come to an end.

Pup -c\\fileserver1\patches\patch.cfg

This example shows how to redirect all of the settings to a configuration file.

Security Patch Update Processor Configuration File

The configuration file is laid out in the same format as an initialization (ini) file. Each section is named using a string enclosed within squared brackets "[ ]". Each value is given a string name followed by an equal sign ("="), then a string value is assigned to the name. The exception to this is the registry settings section. This section is enumerated according to the number of registry settings required to be set or removed.

If a file named pup.cfg exists in the same folder as pup.exe it will be used by default, unless another path is passed with the -c switch at the command-line. If the default configuration file is used, the settings in it can be overridden with command-line switches. If the -c switch is used on the command-line with a viable path to a configuration file, all other command-line switches and all settings in the local configuration file will be ignored.

Security Patch Update Processor Configuration Section

[Patch Version]—This section defines the versioning of the patching process. If set to be used by setting UseVersion to true, security patch update processor will set the registry key and values established by VersionReg and VersionVal, respectively, to the value placed in Version when it has successfully scanned and updated the machine, if required. On subsequent runs, security patch update processor will exit immediately after launch if the registry setting is greater than or equal to the version set in the configuration file.

Version—Numeric version which will be set in the registry and compared on subsequent passes.

VersionReg—Registry key location where version value will be set.

VersionVal—Registry value where version will be stored.

[WSUS]—This section determines whether WUA will use WSUS or Windows Update

Internet site to get its scan information and download patch files.

SetWSUS—Boolean (true or false) which establishes if WSUS is to be used. WSUS can be set at the command-line with the -w switch or it can be set in the configuration file (SetWSUS=true). If the configuration file is local, the command-line will override the configuration file. If the configuration file is set at the command-line, the configuration file settings will override any other switches set at the command-line. If this setting is set to false, it will not remove the WSUS settings. It will only stop any setting from being set according to the event process above. WSUS settings are set or removed only by using the -w command-line switch or the true statement in the setting in the configuration file. To remove WSUS settings using the configuration file, this value is set to true and the other values under the [WSUS] section are removed and either no other switches are used (if local configuration file is used), or the -c switch is used to pass the location of the configuration file.

WSUServer/StatusServer—When set at the command-line, both the WSUServer and the StatusServer settings are set to the same thing, whatever is passed to the -w switch. The configuration file offers an opportunity to have them set differently, if desired.

WSUSRegPath—The default registry setting for WSUS settings is HKLM\SOFTWARE\Policies\Microsoft\Windows\Windows Update. The configuration file allows for an alternative location. This should not be changed in the configuration file unless the location actually changes as the setting in the configuration file overrides what is internally set in the program. The same thing is true for the rest of the settings under WSUS. They are there for the purpose of revising the default settings of Microsoft Windows Update in case they change and should not be modified except in this case.

[WSUSRegAdds]—This section allows for other registry settings for WSUS to be set which cannot be set by the command-line. An HKEY is a handle to the Windows registry key. The format should be exactly like in the example shown above in that the registry root should use the three or four letter representation:

HKLM=HKEY_LOCAL_MACHINE
HKCU=HKEY_CURRENT_USER
HKCR=HKEY_CLASSES_ROOT
HKCC=HKEY_CURRENT_CONFIG
HKU=HKEY_USERS

The HKEY is followed by a backslash with the full path to the registry key. This is followed again by a backslash and the value name which is followed by an equal sign (=) and then the value.

String Values—If the value is a string or REG_SZ then the value alone is fine. If the value has percent signs (%) in the string it will automatically be converted to an expanded string or REG_EXPAND_SZ.

Example

HKLM\SOFTWARE\Policies\Microsoft\Windows\WindowsUpdate\TargetGroup=Home Run Workstations Dword Values—If the value is numeric such as dword or REG_DWORD, then the value needs to have a "d" following it.

Example

HKLM\SOFTWARE\Policies\Microsoft\Windows\WindowsUpdate\TargetGroupEnable d=00000001d

[WSUSRegDels]—This is similar to WSUSRegAdds, except that it is used to remove settings, if required. It works the same way as WSUSRegAdds, except that it needs to go to the value or key name.

Example

HKLM\SOFTWARE\Policies\Microsoft\Windows\WindowsUpdate\TargetGroupEnable d

[ADHocRegAdds] and [ADHocRegDels]—Provides a way to add or remove other registry settings outside of the WSUS settings. The format is exactly the same as the WSUS registry settings above.

[Parameters]—This section provides the operational direction of program execution.

The first three values, Scan, Download and Install replace the -s, -d and -i switches at the command-line. It is important to note that each command is dependent on the previous command. In other words, the Install command requires that the downloads have taken place which depends on the scan having taken place. So the commands must be used from scan down. All three can be true. Scan and download can be true and install false. Scan only can be true while download and install are false. This is similar to the command-line switches in this way.

Prompt—Sets the prompt level by numeric code as shown in Table 1:

TABLE 1

| Numeric Code | Meaning | Explanation |
| --- | --- | --- |
| 0 | prompt all | this level corresponds to no prompt switches on the command-line. |
| 1 | reboots only | this level corresponds to the -r switch on the command-line. |
| 2 | suppress reboots and prompts | this level corresponds to the -n command-line switch. |
| 3 | no prompts (not even for reboots) | this level corresponds to the -q (silent) switch. |

Loglocation—This is used to redirect the location of the log file.

Logfilename—The name of the log file. The file name can be substituted with @ComputerName@ variable to cause the program to substitute the machine name for the log file name.

[WindowsUpdate]—This section is used to replace default program settings if necessary. In most cases these settings should not be changed. The exception is the WUAMinVersion, UpdateWUA and WUAUpdateCmd. These three settings allow for the ability to update the Windows Update Agent if available and needed.

The current setting of WUAMinVersion is the minimum WUA version required for the security patch update processor to be able to work with WUA. The security patch update processor will automatically detect the file version of the file represented by WUAEngDll. If it is less than the value in WUAMinVersion it will determine if there is a value in WUAUpdateCmd. If there is, it will attempt to run the update. If it is successful, it will continue. If it is not, it will exit.

The format of WUAUpdateCmd requires the full path to the update executable followed by a semicolon (;) and then a parameter, as in/quiet.

The security patch update processor requires the file Interop.WUApiLib.dll in order to make use of WUA system calls. Before it attempts to perform any of these calls it checks to see if the file is located in the same path as the executable. If it does not find the file it exists. However, if there is a value in WUAPIUpdatePath pointing to a file represented in WUAPIDll, it will attempt to copy the file local. If it is successful, it will continue. If not, it will exit.

An exemplary configuration of the Pup.cfg files is provided below:
[Patch Version]
Version=1.0
VersionReg=software\enterprise\Pup
VersionVal=PatchVersion
UseVersion=true
[WSUS]
SetWSUS=true
WSUServer=http://wsus.enterprise.com
StatusServer=http://wsus.enterprise.com
WSUSRegPath=SOFTWARE\Policies\Microsoft\Windows\WindowsUpdate
WSUSRegVal=WUServer
WSUSStatRegVal=WUStatusServer
WSUSAURegPath=SOFTWARE\Policies\Microsoft\Windows\WindowsUpdate\AU
[WSUSRegAdds]
HKLM\SOFTWARE\Policies\Microsoft\Windows\WindowsUpdate\

Figure 3:
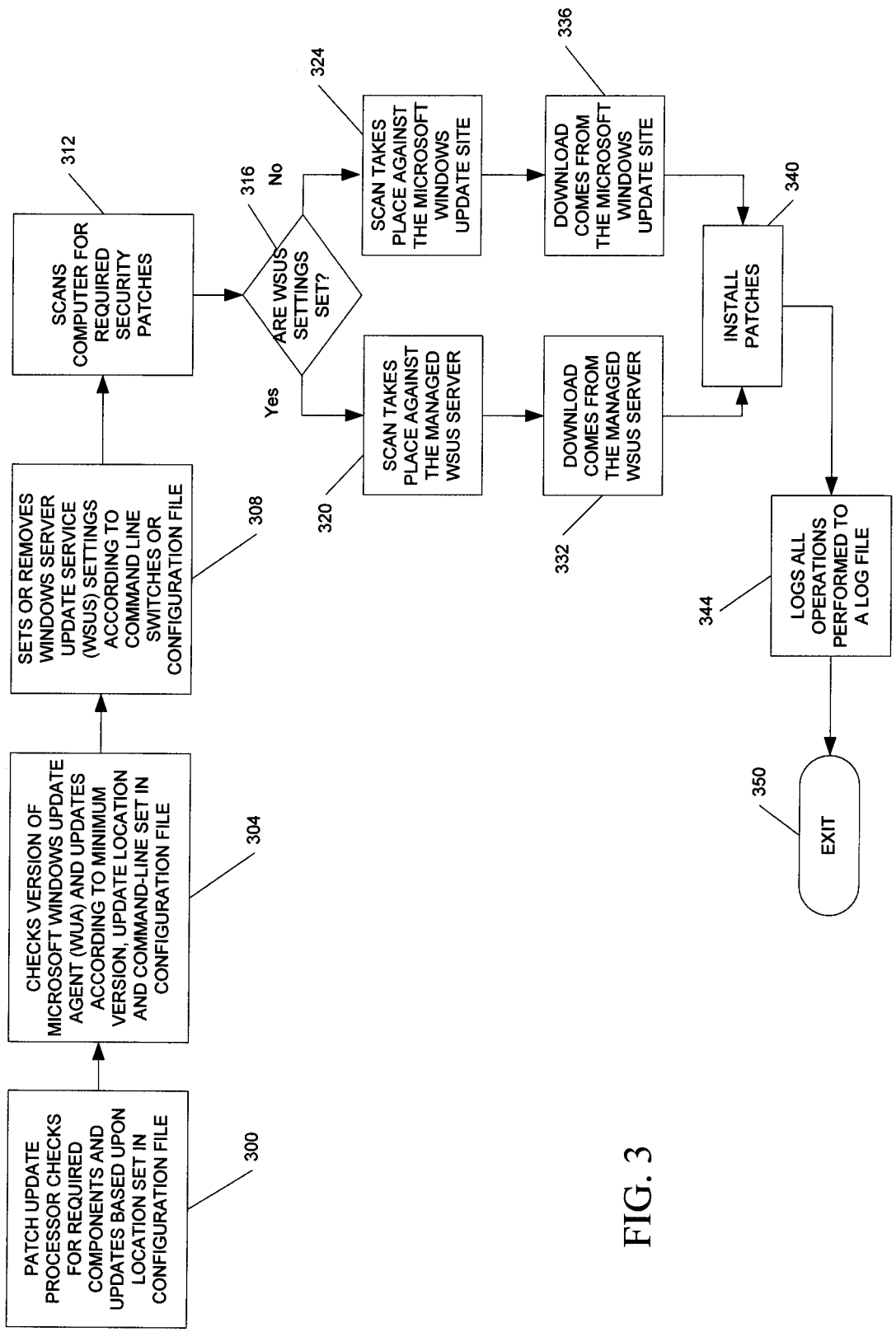
FIG. 3 illustrates processing logic for the security patch update processor in accordance with an exemplary embodiment of the invention.

TargetGroup=Home Run Workstations
HKLM\SOFTWARE\Policies\Microsoft\Windows\WindowsUpdate\
TargetGroupEnabled=00000001d
[WSUSRegDels]
[ADHocRegAdds]
[ADHocRegDels]
[Parameters]
Scan=true
Download=true
Install=true
prompt=3
loglocation=\\logs.enterprise.com\logs$\Patches\
logfilename=@ComputerName@.log
[WindowsUpdate]
AUServiceName=wuauserv
WUAEngDll=wuaueng.dll
WUAMinVersion=5.8.0.2469
WUAPIDll=Interop.WUApiLib.dll
WUAPIUpdatePath=\\gaxgpfp04bl\apps\pup\
UpdateWUA=true
WUAUpdateCmd=\\gaxgpfp04bl\apps\pup\wua\wusetup.exe;/quiet FIG. 3 illustrates exemplary processing logic for the security update patch processor. The patch update processor allows for versioning of the patching process using the configuration file. All steps in the process are prompted by default, although command-line switches can set prompting to silent, suppress reboots, or prompt for reboots only. These settings also can be applied via the configuration file.

The configuration file, named pup.cfg, can be located in the same folder as pup.exe (default setting), in which case command line switches override settings in the configuration file. Registry settings can be added or removed using the configuration file.

All operations performed by the patch update processor are logged by default to a log file located in the same folder location as pup.exe, named pup.log. The log file location and name can be changed to any other location using either the command-line switches or in the configuration file. If the configuration file is used, the name of the file can be represented by the name of the machine creating the file.

The processing logic begins with the patch update processor checking for required components and updates based upon the location set in the configuration file, as indicated in logic block 300. The patch update processor checks for the version of the Microsoft Windows Update Agent (WUA), and updates according to the minimum version, update location, and command line set in the configuration file, as indicated in logic block 304. The patch update processor then sets or removes the Windows Server Update Service (WSUS) settings according to command-line switches or the configuration file, as indicated in logic block 308.

The patch update processor scans the computer for required security patches as shown in logic block 312. If the patch update processor determines that WSUS settings are set in decision block 316 (e.g., SetWSUS=true), the scan for required security patches takes place against the managed WSUS server as indicated in logic block 320. Otherwise, the scan takes place against the Microsoft Windows Update site as indicated in logic block 324. Next, as indicated in logic block 328, the patches that are determined to be required for the specific machine are downloaded from the managed WSUS server or Microsoft Windows Update site, as appropriate. If WSUS settings are set, the patch download comes from the managed WSUS server, as indicated in logic block 332. If WSUS settings are removed, the patch download comes from the Microsoft Windows Update site, as indicated in logic block 336. Patches are then installed on the machine as indicated in logic block 340. The patch update processor logs all patch update operations performed to a log file as indicated in logic block 344. The process ends in block 350.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the scope of the present invention. In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed is:

1. A method, comprising:
   selecting computers from a list of computers on which a job is to run, wherein the computers are located in a certain location;
   transmitting to a task scheduler of each of the selected computers a configuration file storing an identification of the certain location and the job;
   installing the job on each of the selected computers; and
   executing the job on each of the selected computers.

2. The method of claim 1, further comprising:
   determining if the job already exists in the task schedulers on each of the selected computers; and
   removing the job from the task scheduler for each of the selected computers on which the job already exists.

3. The method of claim 1, wherein the selecting computers comprises:
   filtering the list of computers based on a type of computer in the certain location.

4. The method of claim 3, wherein the type of computer is a server or a workstation.

5. The method of claim 1, wherein the selecting computers comprises:
   filtering the list of computers based on a function performed by each computer in the certain location.

6. The method of claim 5, wherein the function comprises at least one of:
   a file server function, a print server function, an application server function, an infrastructure server function, and an electronic mail server function.

7. The method of claim 1, wherein the selecting computers comprises:
   filtering the list of computers based on an associated operating system running on each computer in the certain location.

8. The method of claim 1, comprising,
creating the configuration file.

9. A non-transitory computer-readable medium storing instructions that when executed by a processor cause the processor to perform:
 selecting computers from a list of computers on which a job is to run, wherein the computers are located in a certain location;
 transmitting to a task scheduler of each of the selected computers a configuration file storing an identification of the certain location and the job;
 installing install the job each of the selected computers; and
 executing execute the job on each of the selected computers.

10. The computer program product of claim 9, wherein the instructions further cause the processor to perform:
 determining determine if the job already exists in the task schedulers on each of the selected computers; and
 removing remove the job from the task schedulers for each of the selected computers on which the job already exists.

11. The computer program product of claim 9, wherein, when the instructions cause the processor to select computers from a generated list of computers on which a job is to run, the instructions further cause the processor to perform:
 filtering the list of computers based on a type of computer in the certain location.

12. The computer program product of claim 9, wherein, when the instructions cause the processor to select computers from a generated list of computers on which a job is to run, the instructions further cause the processor to perform:
 filtering the list of computers based on a function performed by each computer in the certain location.

13. The computer program product of claim 9, wherein, when the instructions cause the processor to select computers from a generated list of computers on which a job is to run, the instructions further cause the processor to perform:
 filtering the list of computers based on an associated operating system running on each computer in the certain location.

14. The computer program product of claim 9, wherein, when the instructions cause the processor is to create a configuration file, the instructions further cause the processor to perform:
 creating the configuration file.

15. A system, comprising:
 a memory storing instructions; and
 a processor that when executing the instructions is configured to:
  select computers from a list of computers on which a job is to run, wherein the computers are located in a certain location;
  transmit to a task scheduler of each of the selected computers a configuration file storing an identification of the certain location and the job;
  install the job on each of the selected computers; and
  execute the job on each of the selected computers.

16. The system of claim 15, wherein the processor is further configured to:
 determine if the job already exists in the task schedulers on each of the selected computers; and
 remove the job from the task schedulers for each of the selected computers on which the job already exists.

* * * * *